(12) United States Patent
Lee et al.

(10) Patent No.: US 8,826,747 B2
(45) Date of Patent: Sep. 9, 2014

(54) FLEXIBLE TACTILE SENSOR APPARATUS

(71) Applicant: Samsung Electronics Co., Ltd., Suwon-si (KR)

(72) Inventors: Hyung Kew Lee, Gunpo-si (KR); Jong Baeg Kim, Goyang-si (KR); Joon Ah Park, Seoul (KR); Jae Ik Lee, Goyang-si (KR); Min Ook Kim, Seoul (KR); Soon Jae Pyo, Chungju-si (KR); Tae Young Chung, Seoul (KR)

(73) Assignees: Samsung Electronics Co., Ltd., Suwon (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 13/709,779

(22) Filed: Dec. 10, 2012

(65) Prior Publication Data

US 2013/0186208 A1 Jul. 25, 2013

(30) Foreign Application Priority Data

Jan. 19, 2012 (KR) ........................ 10-2012-0006101

(51) Int. Cl.
*G01L 3/00* (2006.01)
*G01L 5/16* (2006.01)

(52) U.S. Cl.
CPC .. *G01L 5/16* (2013.01); *G01L 5/161* (2013.01)
USPC .................................................. 73/862.046

(58) Field of Classification Search
USPC .................................................. 73/862.046
See application file for complete search history.

(56) References Cited

U.S. PATENT DOCUMENTS

| | | | |
|---|---|---|---|
| 6,286,226 B1 | 9/2001 | Jin | |
| 6,297,063 B1 * | 10/2001 | Brown et al. | 438/2 |
| 7,553,681 B2 * | 6/2009 | Raravikar et al. | 438/15 |
| 7,560,817 B2 * | 7/2009 | Basavanhally et al. | 257/773 |
| 7,569,905 B2 * | 8/2009 | Hantschel et al. | 257/475 |
| 7,872,318 B2 * | 1/2011 | Stewart et al. | 257/414 |
| 8,003,982 B2 * | 8/2011 | Wang et al. | 257/43 |
| 8,120,587 B2 * | 2/2012 | Kim et al. | 345/173 |
| 8,680,876 B2 * | 3/2014 | Kadono | 324/663 |
| 2007/0161263 A1 | 7/2007 | Meisner | |
| 2008/0123078 A1 | 5/2008 | Saraf | |
| 2010/0136224 A1 | 6/2010 | Britx et al. | |
| 2011/0163296 A1 | 7/2011 | Pace et al. | |

FOREIGN PATENT DOCUMENTS

| | | |
|---|---|---|
| JP | 2003-227808 | 8/2003 |
| KR | 10-2007-0102107 | 10/2007 |
| KR | 10-2009-0060877 | 6/2009 |
| KR | 10-2009-0113726 | 11/2009 |
| KR | 10-2011-0018197 | 2/2011 |
| KR | 10-2011-0027965 | 3/2011 |
| WO | 2011/095854 A1 | 8/2011 |

* cited by examiner

*Primary Examiner* — Lisa Caputo
*Assistant Examiner* — Octavia D. Hollington
(74) *Attorney, Agent, or Firm* — Staas & Halsey LLP (57) ABSTRACT

A flexible tactile sensor apparatus is provided. The flexible tactile sensor apparatus may obtain information about an applied force, using a resistance between an upper nano wire array of an upper plate and a lower nano wire array of a lower plate, which may be changed based on a distance, between the upper nano wire array and the lower nano wire array, adjusted in proportion to the force.

19 Claims, 8 Drawing Sheets

FLEXIBLE TACTILE SENSOR APPARATUS

CROSS-REFERENCE TO RELATED APPLICATIONS

This application claims the priority benefit of Korean Patent Application No. 10-2012-0006101, filed on Jan. 19, 2012, in the Korean Intellectual Property Office, the disclosure of which is incorporated herein by reference.

BACKGROUND

1. Field

Embodiments relate to technology for obtaining information about a force, using a change in resistance between an upper nano wire array included in an upper plate and a lower nano wire array included in a lower plate, based on an applied force.

2. Description of the Related Art

A flexible tactile sensor apparatus is used to verify a characteristic of a force, for example, a normal force, a shear force, and the like between a sensor apparatus and a target object. In particular, a polymer and polymer compound based flexible tactile sensor apparatus used in various fields, for example, robotics, bio-technology, and the like, by imitating human skin.

However, a metal strain gauge, a conductive polymer, and the like, which are used as sensing materials in the flexible tactile sensor apparatus, are likely to be transformed permanently when a repetitive weight is applied. Accordingly, the flexible tactile sensor apparatus may have characteristics of low reliability of a sensed signal, and a short lifespan.

Accordingly, there is a need for a high sensitivity flexible tactile sensor apparatus with high reliability and a long lifespan.

SUMMARY

According to an aspect of one or more embodiments, there is provided a flexible tactile sensor apparatus, including an upper plate comprising an upper nano wire array, a lower plate comprising a lower nano wire array, and a fastener to maintain a distance, between the upper nano wire array and the lower nano wire array, that is adjusted in proportion to a force applied through the upper plate.

The upper nano wire array and the lower nano wire array may be collinearly aligned to face each other and to be proximate to or separate from each other, based on the adjusted distance.

The fastener may increase or decrease a number of wires connected between the upper nano wire array and the lower nano wire array, based on a result of adjusting the distance between the upper nano wire array and the lower nano wire array.

The upper nano wire array and the lower nano wire array may be formed of a conductive material, and the upper plate and the lower plate may be formed of an insulating material. The upper plate and the lower plate may also be formed of an elastic and insulating material.

The flexible tactile sensor apparatus may further include a controller to obtain information about the force applied through the upper plate, by measuring a resistance, between the upper nano wire array and the lower nano wire array, which may be changed based on a result of adjusting the distance between the upper nano wire array and the lower nano wire array.

The controller may obtain a magnitude of the force, as the information about the force, using a change in resistance between a first resistance measured before the distance is adjusted and a second resistance measured after the distance is adjusted.

The controller may measure a plurality of resistances associated with a single force applied through the upper plate, and may obtain a direction of the force, as the information about the force in view of differences among the plurality of resistances.

The flexible tactile sensor apparatus may further include a bump to be touched by a finger of a user applying the force. The bump may be a plate. The bump may also be smaller than a size of a lower portion of the upper plate and may concentrate the applied force to restrict dispersion of the applied force.

One or more embodiments may include a flexible tactile sensor apparatus that may readily obtain information about an applied force, for example, a magnitude of the force, and a direction of the force, using a change in resistance between an upper nano wire array included in an upper plate and a lower nano wire array included in a lower plate, based on the applied force.

One or more embodiments may also include a flexible tactile sensor apparatus that may be applied to various devices, for example, a robot, and an artificial hand for the disabled, and may easily verify a force applied to a corresponding device and transfer information about the force to a user, thereby enabling a sophisticated control of an operating force based on the transferred power, and improving efficiency and safety of tasks using the corresponding device.

One or more embodiments may also include a flexible tactile sensor apparatus that may use, as a nano wire array, a carbon nanotube (CNT) with relatively high conductivity and tensile strength, thereby realizing a high reliability of a sensed signal, for example, a resistance, and a long lifespan.

According to an aspect of one or more embodiments, there may be provided a flexible tactile sensor apparatus including an upper plate comprising an upper nano wire array; a lower plate comprising a lower nano wire array; and a fastener to adjust a distance between the upper nano wire array and the lower nano wire array, in proportion to a force applied through the upper plate.

A controller may obtain magnitude and direction of the force applied through the upper plate, by measuring a resistance, between the upper nano wire array and the lower nano wire array, wherein at least one of the magnitude and direction may be changed based on a result of adjusting the distance between the upper nano wire array and the lower nano wire array.

The controller may obtain the magnitude of the force, using a change in resistance between a first resistance measured before the distance is adjusted and a second resistance measured after the distance is adjusted.

The controller may measure a plurality of resistances associated with a single force applied through the upper plate, and may obtain a direction of the force based on differences among the plurality of resistances.

A fastener may adjust the distance between the upper nano wire array and the lower nano wire array, in proportion to the force applied through the upper plate or may maintain the distance between the upper nano wire array and the lower nano wire array.

The applied force may be a compression force, wherein when the distance between the upper nano wire array and the lower nano wire array decreases in proportion to the compression force, the fastener may increase the number of wires connected between the upper nano wire array and the lower nano wire array to a number greater than a predetermined number of wires; and wherein when no force is applied through the upper plate, a resistance between the upper nano wire array and the lower nano wire array may be less than a default resistance measured when a predetermined distance is maintained or may be less than a resistance measured immediately before the compression force is applied.

The applied force may be a tension force, wherein when the distance between the upper nano wire array and the lower nano wire array increases in proportion to the tension force, the fastener may decrease the number of wires connected between the upper nano wire array and the lower nano wire array to a number less than a predetermined number of wires; and wherein when no force is applied, a resistance between the upper nano wire array and the lower nano wire array may be greater than a default resistance measured when the predetermined distance is maintained or may be greater than a resistance measured immediately before the tension force is applied.

The controller may obtain the magnitude of the force using a change in resistance between a first resistance measured before the distance is adjusted and a second resistance measured after the distance is adjusted, wherein when the second resistance is greater than the first resistance, the controller obtains a magnitude of the tension force, which is proportional to a difference value between the first resistance and the second resistance; and wherein when the second resistance is less than the first resistance, the controller obtains a magnitude of the compression force, which is proportional to a difference between the first resistance and the second resistance.

A controller may measure a plurality of resistances associated with a single force applied through the upper plate, and may obtain a direction of the force based on differences among the plurality of resistances, wherein when a left resistance between the upper nano wire array and the lower nano wire array that are disposed on a left side of the upper and lower nano wire arrays and a right resistance between the upper nano wire array and the lower nano wire array that are disposed on the right side of the upper and lower nano wire arrays are measured through the single force applied through the upper plate, and when the left resistance is greater than the right resistance, the controller may obtain a shear force in a right direction, which is proportional to a difference between the left resistance and the right resistance.

A controller may measure a plurality of resistances associated with a single force applied through the upper plate, and may obtain a direction of the force based on differences among the plurality of resistances, wherein when a left resistance between the upper nano wire array and the lower nano wire array that are disposed on a left side of the upper and lower nano wire arrays and a right resistance between the upper nano wire array and the lower nano wire array that are disposed on the right side of the upper and lower nano wire arrays are measured through the single force applied through the upper plate, and when the right resistance is greater than the left resistance, the controller may obtain a shear force in a left direction, which is proportional to a difference between the left resistance and the right resistance.

A controller may measure a plurality of resistances associated with a single force applied through the upper plate, and may obtain a direction of the force based on differences among the plurality of resistances, wherein when the plurality of resistances measured in association with the single force applied through the upper plate is identical or differences among the plurality of resistances satisfy a predetermined range, the controller may obtain a normal force magnitude corresponding to the changed resistances.

According to an aspect of one or more embodiments, there is provided a method for measuring force with a flexible tactile sensor having an upper plate including an upper nano wire, a lower plate including a lower nano wire, and a fastener, the method including applying a force through the upper plate of the flexible tactile sensor; measuring a resistance to be changed in proportion to the force applied through the upper plate when the distance between an upper nano wire and a lower nano wire is adjusted; and obtaining a magnitude of the force and a direction of the force using the measured resistance.

According to another aspect of one or more embodiments, there is provided at least one non-transitory computer readable medium storing computer readable instructions to implement methods of one or more embodiments.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
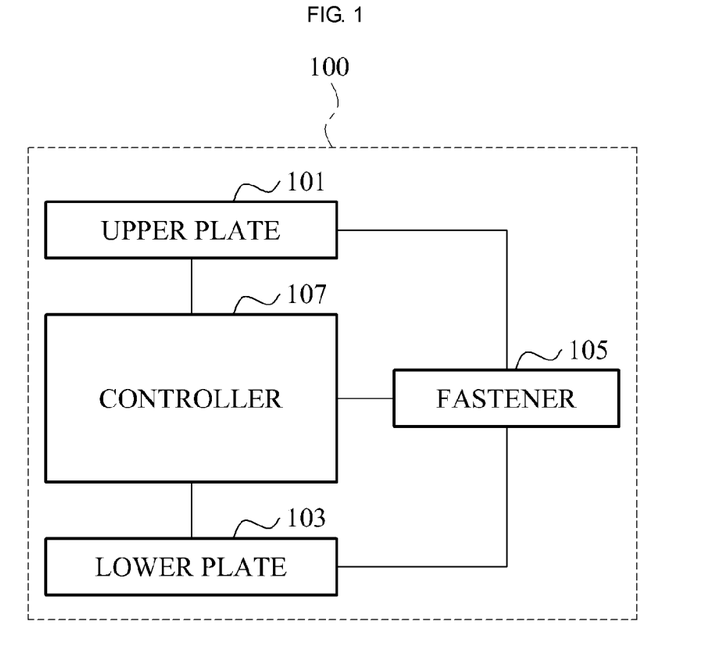
FIG. 1 illustrates a configuration of a flexible tactile sensor apparatus according to embodiments.

FIG. 1 illustrates a configuration of a flexible tactile sensor apparatus 100 according to embodiments.

Referring to FIG. 1, the flexible tactile sensor apparatus 100 may include an upper plate 101, a lower plate 103, and a fastener 105. Also, the flexible tactile sensor apparatus 100 may further include a controller 107.

The upper plate 101 may include an upper nano wire array on a lower portion of the upper plate 101.

Also, the upper plate 101 may further include a bump (not shown) on an upper portion of the upper plate 101. Here, the bump may refer to a portion to be touched by a finger of a user applying a force. The bump may be formed to be smaller than a size of the lower portion of the upper plate 101, and may concentrate the applied force to restrict dispersion of the applied force. For example, although the bump may be provided in a form of a plate, the form may not be limited thereto.

The lower plate 103 may include a lower nano wire array on an upper portion of the lower plate 103.

The upper plate 101 and the lower plate 103 may be formed of an elastic and insulating material, for example, polydimethylsiloxane (PDMS). A distance between the upper plate 101 and the lower plate 103 may be changed in proportion to a force applied through the upper plate 101.

The upper nano wire array and the lower nano wire array may be disposed at corresponding positions on the upper plate 101 and the lower plate 103, respectively. The upper nano wire array and the lower nano wire array may be collinearly aligned to face each other and to be proximate to or separate from each other, based on a distance to be adjusted in proportion to the force applied through the upper plate 101.

When the upper nano wire array and the lower nano wire array become proximate to each other, a number of wires to be connected will increase. When the upper nano wire array and the lower nano wire array become distant from each other, the number of wires to be connected will decrease.

Here, the upper nano wire array and the lower nano wire array may be formed of a conductive material, for example, a carbon nanotube (CNT).

The fastener 105 may refer to a portion to connect the upper plate 101 and the lower plate 103, for example, a connecting link, or a portion in which the upper plate 101 and the lower plate 103 contact each other. The fastener 105 may maintain the distance between the upper nano wire array and the lower nano wire array, which is adjusted in proportion to the force applied through the upper plate 101. When a force is not applied through the upper plate 101, the fastener 105 may maintain the distance between the upper nano wire array and the lower nano wire array so that the number of wires connected between the upper nano wire array and the lower nano wire array may be less than or equal to a predetermined number of wires.

The fastener 105 may increase or decrease the number of wires connected between the upper nano wire array and the lower nano wire array, based on a result of adjusting the distance between the upper nano wire array and the lower nano wire array.

That is, when the distance between the upper nano wire array and the lower nano wire array decreases in proportion to an applied force, for example, a compression force, the fastener 105 may increase the number of wires connected between the upper nano wire array and the lower nano wire array to a number greater than the predetermined number of wires. In this instance, when a force is not applied, a resistance between the upper nano wire array and the lower nano wire array may become relatively less than (1) a default resistance measured when a predetermined distance is maintained or (2) a resistance measured immediately before the force is applied.

Conversely, when the distance between the upper nano wire array and the lower nano wire array increases in proportion to an applied force, for example, a tension force, the fastener 105 may decrease the number of wires connected between the upper nano wire array and the lower nano wire array to a number less than the predetermined number of wires. In this instance, when a force is not applied, the resistance between the upper nano wire array and the lower nano wire array may become relatively greater than (1) the default resistance measured when the predetermined distance is maintained or (2) the resistance measured immediately before the force is applied.

The controller 107 may obtain information about the force applied through the upper plate 101, for example, a magnitude of the force, and a direction of the force, by measuring a resistance, between the upper nano wire array and the lower nano wire array, which may be changed based on a result of adjusting the distance between the upper nano wire array and the lower nano wire array. In this instance, the controller 107 may measure the resistance between the upper nano wire array and the lower nano wire array, using a first metallic line connected to the upper nano wire array and a second metallic line connected to the lower nano wire array.

In particular, the controller 107 may obtain a magnitude of the force, as the information about the force, using a change in resistance between a first resistance measured before the distance is adjusted, for example, the default resistance, and a second resistance measured after the distance is adjusted. For example, when the second resistance is greater than the first resistance, the controller 107 may obtain a magnitude of a tension force, that is, a pulling force, which is proportional to a difference value between the first resistance and the second resistance. When the second resistance is less than the first resistance, the controller 107 may obtain a magnitude of a compression force, that is, a pressing force, which is proportional to a difference between the first resistance and the second resistance.

Also, the controller 107 may measure a plurality of resistances associated with a single force applied through the upper plate 101, and may obtain a direction of the force, as the information about the force, in view of differences among the plurality of resistances.

For example, when a left resistance between an upper nano wire array and a lower nano wire array that are disposed on a left side, and a right resistance between an upper nano wire array and a lower nano wire array that are disposed on a right side are measured in association with the single force applied through the upper plate 101, and when the left resistance is greater than the right resistance, the controller 107 may obtain a shear force in a right direction, which may be proportional to a difference between the left resistance and the right resistance. In this instance, the left resistance may be greater than a predetermined resistance, for example, a default resistance, and the right resistance may be less than the predetermined resistance.

Conversely, when the right resistance is greater than the left resistance, the controller 107 may obtain a shear force in a left direction, which may be proportional to a difference between the left resistance and the right resistance. In this instance, the right resistance may be greater than the predetermined resistance, for example, the default resistance, and the left resistance may be less than the predetermined resistance.

In this instance, when the plurality of resistances measured in association with the single force applied through the upper plate 101 is identical or differences among the plurality of resistances satisfy a predetermined range, that is, when each of the plurality of resistances is changed, for example, increased by an identical value, the controller 107 may obtain a normal force of a magnitude corresponding to the plurality of resistances changed.

Figure 2:
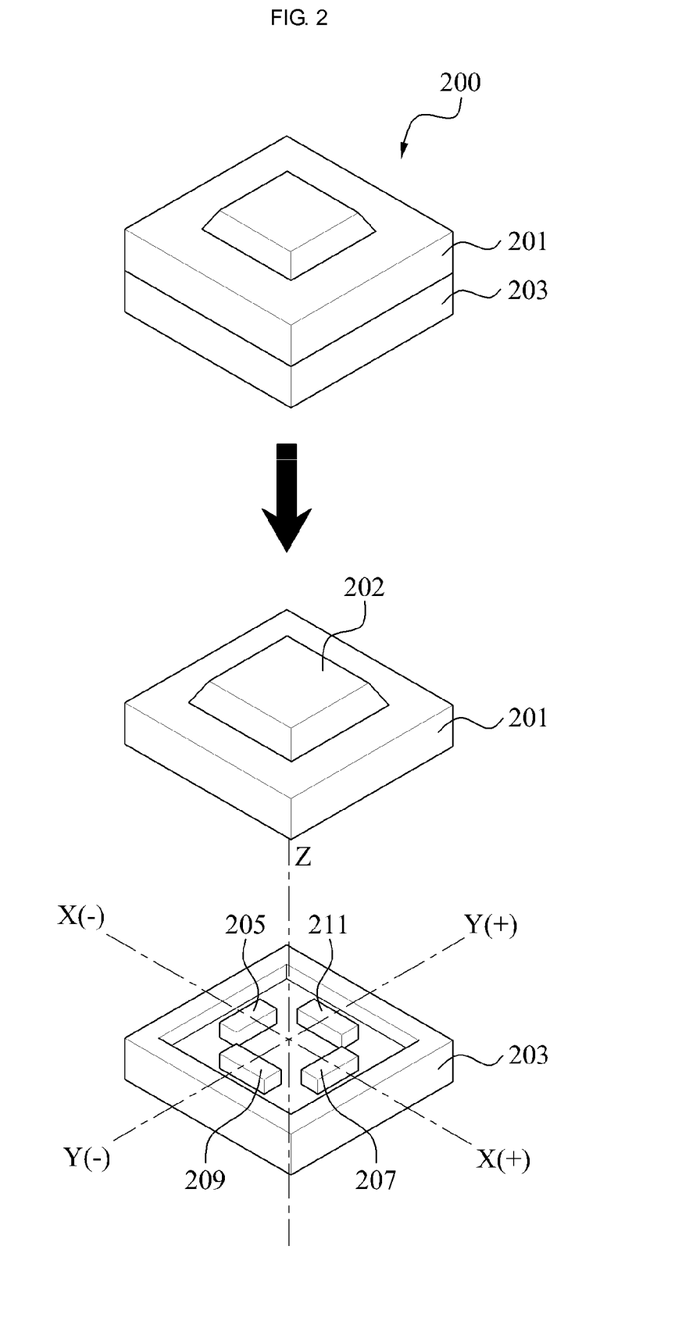
FIG. 2 illustrates a flexible tactile sensor apparatus according to embodiments.

FIG. 2 illustrates a flexible tactile sensor apparatus 200 according to embodiments.

Referring to FIG. 2, the flexible tactile sensor apparatus 200 may include an upper plate 201 and a lower plate 203. Here, the upper plate 201 and the lower plate 203 may be connected to each other by a fastener (not shown).

The upper plate 201 may include, for example, four upper nano wire arrays on a lower portion, and a bump 202 on an upper portion.

The lower plate 203 may include, for example, four lower nano wire arrays.

The flexible sensor apparatus 200 may obtain information about a force applied through the upper plate 201, by measuring resistances, between the upper nano wire arrays of the upper plate 201 and the lower nano wire arrays of the lower plate 203, which may be changed based on a distance to be adjusted in proportion to the force applied through the upper plate 201.

In particular, the flexible tactile sensor apparatus 200 may obtain a magnitude of a force applied in an x-axial direction, using a first resistance between a first upper nano wire array (not shown) disposed on the upper plate 201 and a first lower nano wire array 205 disposed on the lower plate 203, and a second resistance between a second upper nano wire array (not shown) disposed on the upper plate 201 and a second lower nano wire array 207 disposed on the lower plate 203. That is, the flexible tactile sensor apparatus 200 may obtain the magnitude of the force applied in the x-axial direction when the first resistance is different from the second resistance. In this instance, when the first resistance is greater than the second resistance, the flexible tactile sensor apparatus 200 may obtain the magnitude of the force, corresponding to the difference, applied in a positive (+) direction of the x axis. When the second resistance is greater than the first resistance, the flexible tactile sensor apparatus 200 may obtain the magnitude of the force, corresponding to the difference, applied in a negative (−) direction of the x axis.

The flexible tactile sensor apparatus 200 may obtain a magnitude of a force applied in a y-axial direction, using a third resistance between a third upper nano wire array (not shown) disposed on the upper plate 201 and a third lower nano wire array 209 disposed on the lower plate 203, and a fourth resistance between a fourth upper nano wire array (not shown) disposed on the upper plate 201 and a fourth lower nano wire array 211 disposed on the lower plate 203. That is, the flexible tactile sensor apparatus 200 may obtain the magnitude of the force applied in the y-axial direction when the third resistance is different from the fourth resistance. In this instance, when the third resistance is greater than the fourth resistance, the flexible tactile sensor apparatus 200 may obtain the magnitude of the force, corresponding to the difference, applied in a positive (+) direction of the y axis. When the fourth resistance is greater than the third resistance, the flexible tactile sensor apparatus 200 may obtain the magnitude of the force, corresponding to the difference, applied in a negative (−) direction of the y axis.

Also, in association with the single force applied through the upper plate 201, when the first resistance is identical to the second resistance or the third resistance is identical to the fourth resistance, or when all of the first resistance, the second resistance, the third resistance, and the fourth resistance are identical, the flexible tactile sensor apparatus 200 may obtain a magnitude of a force applied in a z-axial direction, using at least one of the first resistance, the second resistance, the third resistance, and the fourth resistance.

Figure 3:
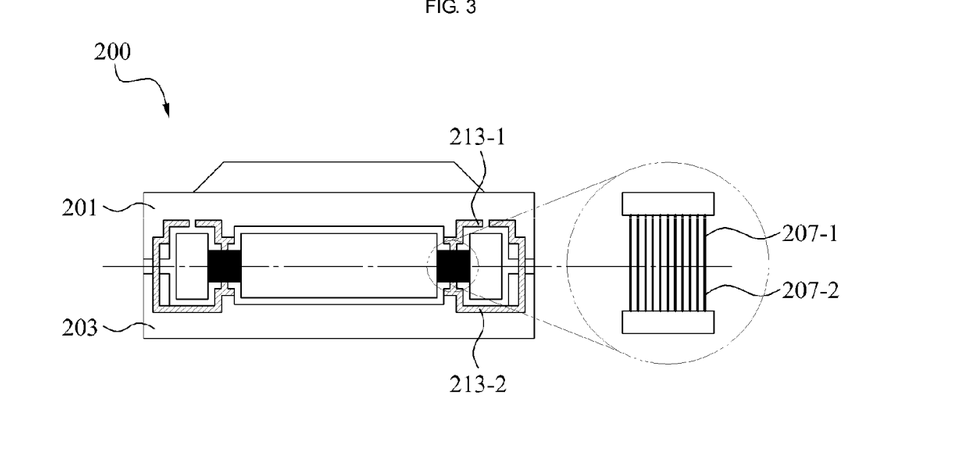
FIG. 3 illustrates a section cut along an x axis of FIG. 2 according to embodiments.

FIG. 3 illustrates a section cut along an x axis of FIG. 2 according to embodiments.

Referring to FIG. 3, the flexible tactile sensor apparatus 200 may include the upper plate 201 and the lower plate 203. The flexible tactile sensor apparatus 200 may maintain a distance, between an upper nano wire array 207-1 disposed on the upper plate 201 and a lower nano wire array 207-2 disposed on the lower plate 203, which may be adjusted in proportion to a force applied through the upper plate 201.

When a force is not applied through the upper plate 201, the flexible tactile sensor apparatus 200 may maintain a distance between the upper nano wire array 207-1 and the lower nano wire array 207-2 so that a number of wires connected between the upper nano wire array 207-1 and the lower nano wire array 207-2 may become less than or equal to a predetermined number of wires.

Also, the flexible tactile sensor apparatus 200 may adjust the distance between the upper nano wire array 207-1 and the lower nano wire array 207-2 when a distance between the upper plate 201 and the lower plate 203 is changed in proportion to the force applied through the upper plate 201, and may increase or decrease the number of wires connected between the upper nano wire array 207-1 and the lower nano wire array 207-2, based on a result of adjusting the distance between the upper nano wire array 207-1 and the lower nano wire array 207-2.

The flexible tactile sensor apparatus 200 may include a first metallic line 213-1 connected to the upper nano wire array 207-1 and a second metallic line 213-2 connected to the lower nano wire array 207-2. The flexible tactile sensor apparatus 200 may measure a resistance that may be changed in accordance with an increase or decrease in the number of wires connected between the upper nano wire array 207-1 and the lower nano wire array 207-2, using the first metallic line 213-1 and the second metallic line 213-2.

Figure 4:
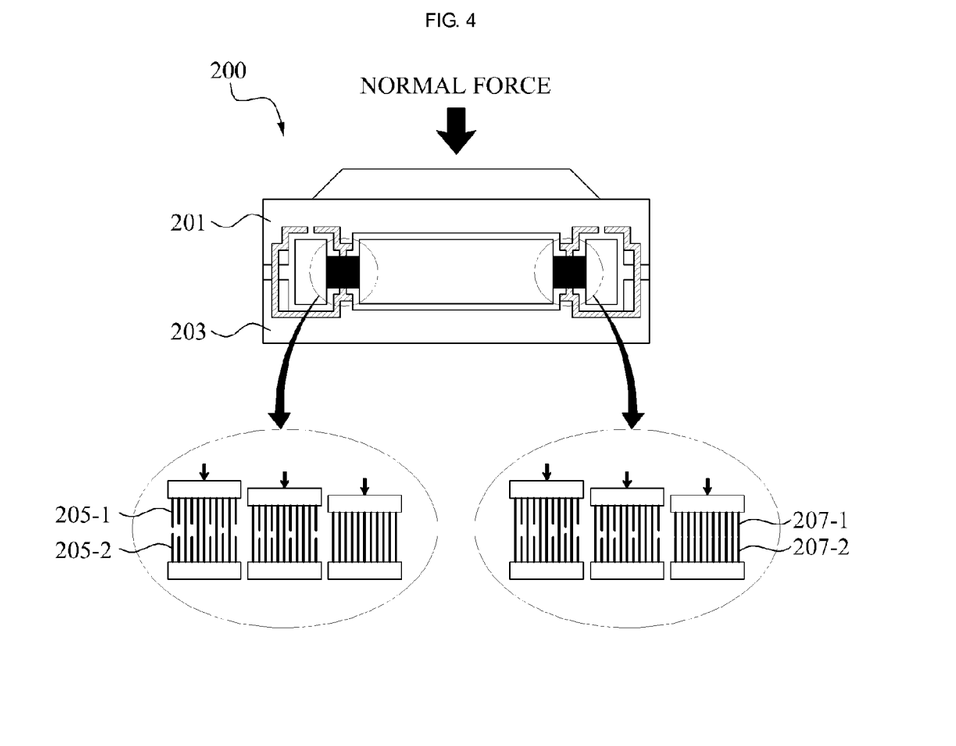
FIG. 4 illustrates an operation of the flexible tactile sensor apparatus of FIG. 2 according to embodiments.

FIG. 4 illustrates an operation of the flexible tactile sensor apparatus 200 of FIG. 2 according to embodiments.

Referring to FIG. 4, the flexible tactile sensor apparatus 200 may adjust a distance between an upper nano wire array and a lower nano wire array when a distance between the upper plate 201 and the lower plate 203 is changed in proportion to a force applied through the upper plate 201. The flexible tactile sensor apparatus 200 may increase or decrease a number of wires connected between the upper nano wire array and the lower nano wire array, based on a result of adjusting the distance between the upper nano wire array and the lower nano wire array.

For example, when a normal force is applied through the upper plate 201, the distance between the upper nano wire array disposed on the upper plate 201 and the lower nano wire array disposed on the lower plate 203 may decrease. In this instance, the flexible tactile sensor apparatus 200 may increase the number of wires connected between the upper nano wire array and the lower nano wire array to a number greater than a predetermined number of wires. However, when a force is not applied, a resistance between the upper nano wire array and the lower nano wire array may be less than a default resistance measured when the predetermined distance is maintained.

That is, when a normal force is applied through the upper plate 201, the flexible tactile sensor apparatus 200 may increase each of a number of wires connected between a first upper nano wire array 205-1 and a first lower nano wire array 205-2 and a number of wires connected between a second upper nano wire array 207-1 and a second lower nano wire array 207-2, to a number greater than a predetermined number of wires.

Accordingly, the flexible tactile sensor apparatus 200 may measure a plurality of resistances associated with a single force applied through the upper plate 201, and may obtain a normal force of a magnitude corresponding to an increased amount of the plurality of resistances when each of the plurality of resistances measured becomes greater than a predetermined resistance, for example, a default resistance, by an identical value. That is, the flexible tactile sensor apparatus 200 may measure, in association with the normal force applied through the upper plate 201, a first resistance between the first upper nano wire array 205-1 and the first lower nano wire array 205-2, and a second resistance between the second upper nano wire array 207-1 and the second lower nano wire array 207-2. When each of the measured first resistance and the measured second resistance becomes greater than the predetermined resistance, for example, the default resistance, by an identical value, the flexible tactile sensor apparatus 200 may obtain a magnitude of the normal force corresponding to the increased resistance, as the information about the force.

Figure 5:
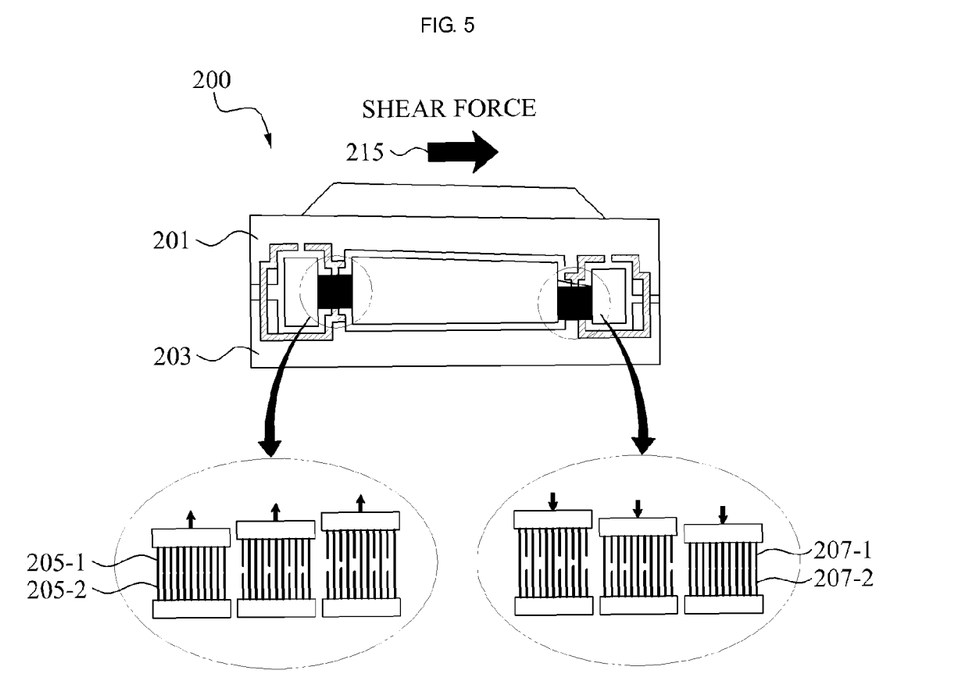
FIG. 5 illustrates an operation of the flexible tactile sensor apparatus of FIG. 2 according to embodiments.

FIG. 5 illustrates an operation of the flexible tactile sensor apparatus 200 of FIG. 2 according to other embodiments.

Referring to FIG. 5, when a distance between the upper plate 201 and the lower plate 203 is changed in proportion to a force applied through the upper plate 201, the flexible tactile sensor apparatus 200 may adjust a distance between an upper nano wire array and a lower nano wire array, and may increase or decrease a number of wires connected between the upper nano wire array and the lower nano wire array based on a result of adjusting the distance between the upper nano wire array and the lower nano wire array.

For example, it may be assumed that a shear force is applied through the upper plate 201. Since a tension force may be applied on a left side, the flexible tactile sensor apparatus 200 may decrease a number of wires connected between the first upper nano wire array 205-1 and the first lower nano wire array 205-2 to a number less than a predetermined number of wires. Conversely, since a compression force may be applied on a right side, the flexible tactile sensor apparatus 200 may increase a number of wires connected between the second upper nano wire array 207-1 and the second lower nano wire array 207-2 to a number greater than the predetermined number of wires. In this instance, when a force is not applied, a first resistance between the first upper nano wire array 205-1 and the first lower nano wire array 205-2 may be greater than a default resistance measured when a predetermined distance is maintained. When a force is not applied, a second resistance between the second upper nano wire array 207-1 and the second lower nano wire array 207-2 may be less than the default resistance measured when the predetermined distance is maintained.

Accordingly, the flexible tactile sensor apparatus 200 may measure a plurality of resistances associated with a single force applied through the upper plate 201, and may obtain a magnitude of a shear force corresponding to differences among the plurality of resistances when resistances among the plurality of resistances measured are different from one another. That is, the flexible tactile sensor apparatus 200 may measure the first resistance and the second resistance. When the first resistance is different from the second resistance, the flexible tactile sensor apparatus 200 may obtain, as the information about the force, the magnitude of the shear force, corresponding to a difference between the first resistance and the second resistance, applied in an x-axial direction.

In this instance, when the first resistance is greater than the second resistance, the flexible tactile sensor apparatus 200 may obtain a shear force in a positive (+) x-axial direction 215. When the second resistance is greater than the first resistance, the flexible tactile sensor apparatus 200 may obtain a shear force in a negative (−) x-axial direction.

Figure 6:
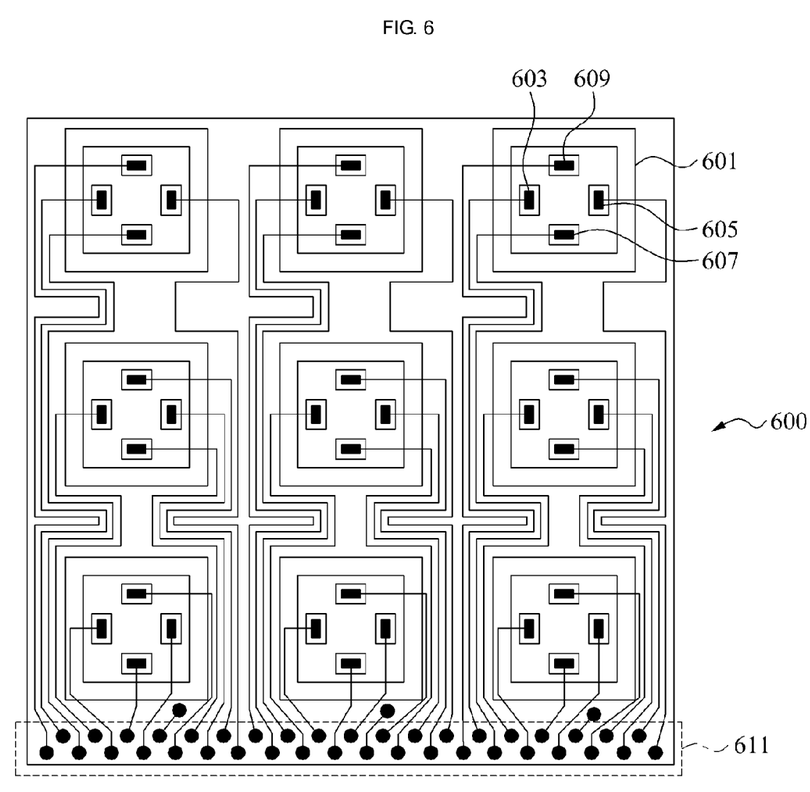
FIG. 6 illustrates a flexible tactile sensor apparatus configured in a form of an array according to embodiments.

FIG. 6 illustrates a flexible tactile sensor apparatus 600 configured in a form of an array according to embodiments. Here, FIG. 6 may correspond to a top perspective view of the flexible tactile sensor apparatus 600 viewed from above.

Referring to FIG. 6, the flexible tactile sensor apparatus 600 may include a plurality of unit sensors, and may use the flexible tactile sensor apparatus 100 of FIG. 1 as a unit sensor. The flexible tactile sensor apparatus 600 may include, for example, nine unit sensors arranged in a 3×3 format, each having an identical internal configuration. Here, a unit sensor 601 may include two nano wire arrays positioned on an x axis, that is, a first nano wire array 603 and a second nano wire array 605, and two nano wire array sets positioned on a y axis, that is, a third nano wire array 607 and a fourth nano wire array 609. In this instance, each nano wire array may include an upper nano wire array and a lower nano wire array.

Since each unit sensor includes four nano wire arrays, the flexible tactile sensor apparatus 600 may include thirty-six nano wire arrays. In this instance, the flexible tactile sensor apparatus 600 may dispose, on a portion 611, connecting terminals with respect to thirty-six metallic lines that are connected to the thirty-six nano wire arrays, respectively, thereby facilitating a connection with a predetermined device, for example, an external measuring device that may measure a resistance among a plurality of nano wire arrays.

With an increase in a number of nano wire arrays included in an internal portion, the flexible tactile sensor apparatus 600 may obtain more accurate information about a force applied to the flexible tactile sensor apparatus 600, using increased resistances among the nano wire arrays.

That is, the flexible tactile sensor apparatus 600 may obtain information about a force applied in an x-axial direction, using resistances among eighteen nano wire arrays positioned on the x axis of each unit sensor, and may obtain information about a force applied in a y-axial direction, using resistances among eighteen nano wire arrays positioned on the y axis of each unit sensor. Also, the flexible tactile sensor apparatus 600 may obtain information about a force applied in a z-axial direction, using both the resistances among the eighteen nano wire arrays positioned on the x axis of each unit sensor and the resistances among the nano wire arrays positioned on the y axis of each unit sensor.

Figure 7:
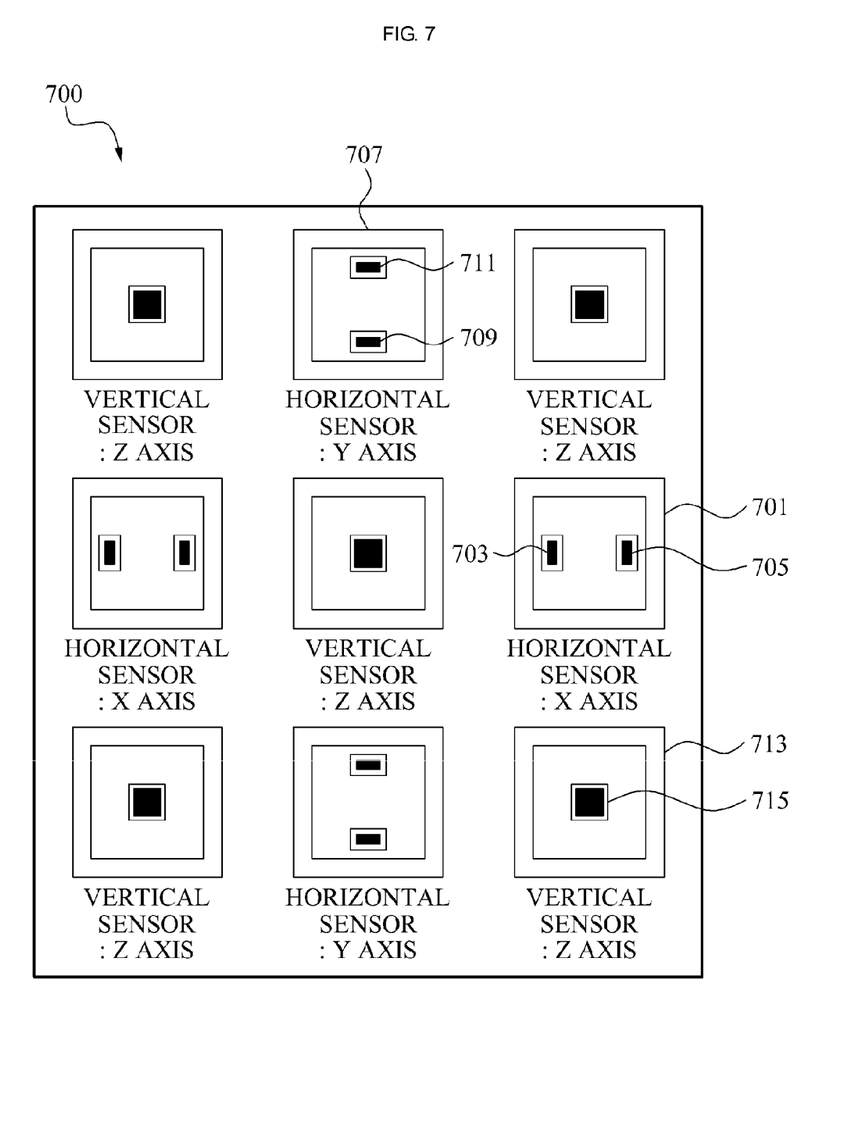
FIG. 7 illustrates a flexible tactile sensor apparatus configured in a form of an array according to other embodiments.

FIG. 7 illustrates a flexible tactile sensor apparatus 700 configured in a form of an array according to other embodiments.

Referring to FIG. 7, the flexible tactile sensor apparatus 700 may include a plurality of unit sensors, and may use the flexible tactile sensor apparatus 100 of FIG. 1 as a unit sensor. The flexible tactile sensor apparatus 700 may include, for example, nine unit sensors arranged in a 3×3 format, each having a different internal configuration, for example, a different number of nano wire arrays and different positions of nano wire arrays. For example, a first unit sensor 701 may include two nano wire arrays positioned on an x axis, that is, a first nano wire array 703 and a second nano wire array 705. A second unit sensor 707 may include two nano wire arrays positioned on a y axis, that is, a third nano wire array 709 and a fourth nano wire array 711. A third unit sensor 713 may include a single nano wire array 715. In this instance, each nano wire array may include an upper nano wire array and a lower nano wire array.

Since the flexible tactile sensor apparatus 700 includes two first unit sensors, two second unit sensors, and five third unit sensors, the flexible tactile sensor apparatus 700 may include thirteen nano wire arrays.

The flexible tactile sensor apparatus 700 may obtain information about a force applied in an x-axial direction, using resistances among four nano wire arrays positioned on the x axis of each of the first unit sensors, and may obtain information about a force applied in a y-axial direction, using resistances among four nano wire arrays positioned on the y axis of each of the second unit sensors. Also, the flexible tactile sensor apparatus 700 may obtain information about a force applied in a z-axial direction, using resistances among five nano wire arrays positioned on a z axis of each of the third unit sensors.

Since the flexible tactile sensor apparatus 700 may include the plurality of different unit sensors, the flexible tactile sensor apparatus 700 may include a fewer number of nano wire arrays than a number of nano wire arrays included in the flexible tactile sensor apparatus 600 of FIG. 6, thereby reducing a number of metallic lines connected to the nano wire arrays, and also obtaining accurate information about a force applied to the flexible tactile sensor apparatus 700.

Figure 8:
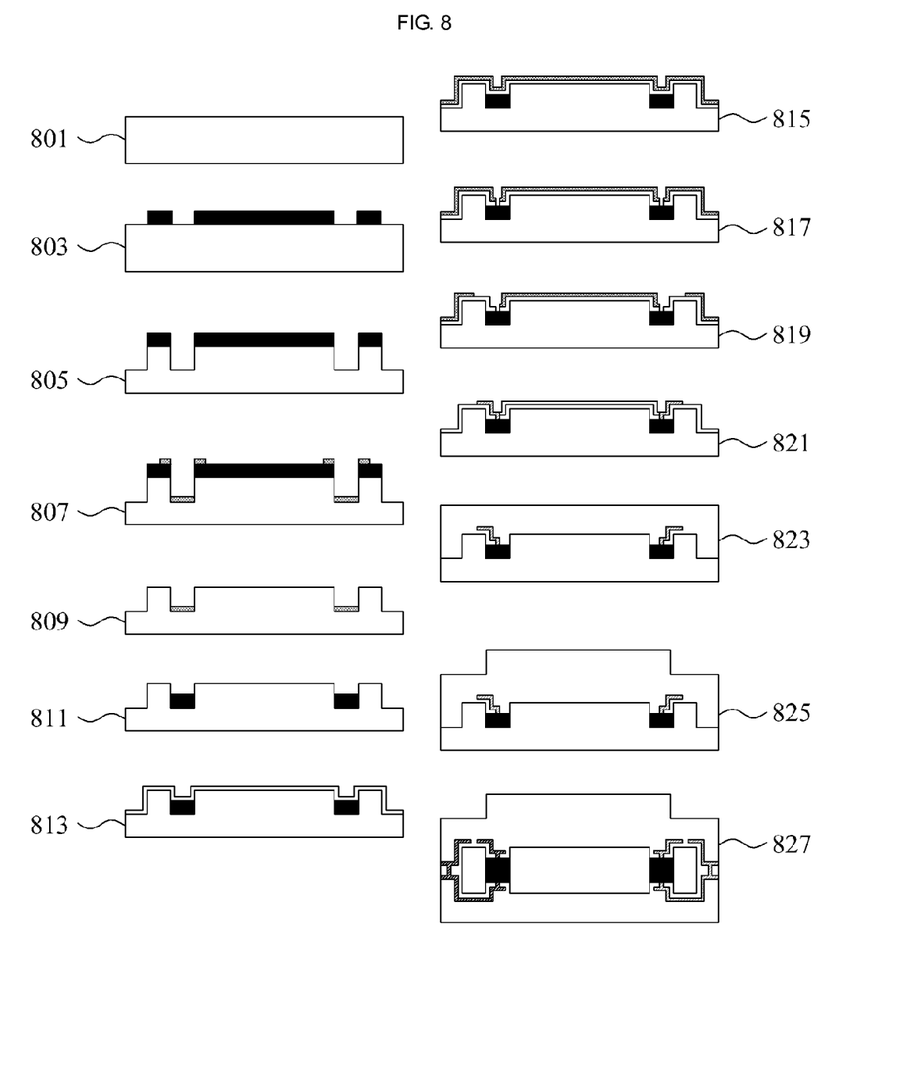
FIG. 8 illustrates a method of manufacturing a flexible tactile sensor apparatus according to embodiments.

FIG. 8 illustrates a method of manufacturing a flexible tactile sensor apparatus according to embodiments.

Referring to FIG. 8, a substrate may be provided in operation 801. The substrate may be formed of, for example, silicon (Si).

In operation 803, a first photo resist (PR) pattern, defining a hole in which a nano wire array may be disposed, may be formed on the substrate.

In operation 805, the hole in which a nano wire array may be disposed may be formed by etching the substrate using the first PR pattern as an etching mask.

In operation 807, metal, for example, iron, may be deposited.

In operation 809, the first PR pattern may be removed. Here, the first PR pattern may be removed by a vapor deposition scheme using, for example, hydrogen fluoride.

In operation 811, a nano wire array may be formed by growing a CNT.

In operation 813, polymer coating may be performed.

In operation 815, PR coating may be performed.

In operation 817, via hole patterning may be performed.

In operation 819, a second PR pattern, defining a metallic line, may be formed.

In operation 821, the metallic line may be formed using the second PR pattern, and the second PR pattern may be removed, for example, through lift-off process.

In operation 823, a layer may be formed by pouring liquid PDMS, and the formation of a lower plate may be completed.

In addition, the formation of an upper plate may be completed by performing operation 825 of forming a bump on an upper portion, after performing operations 801 through 823.

In operation 827, a flexible tactile sensor apparatus may be formed by fastening the upper plate and the lower plate.

Figure 9:
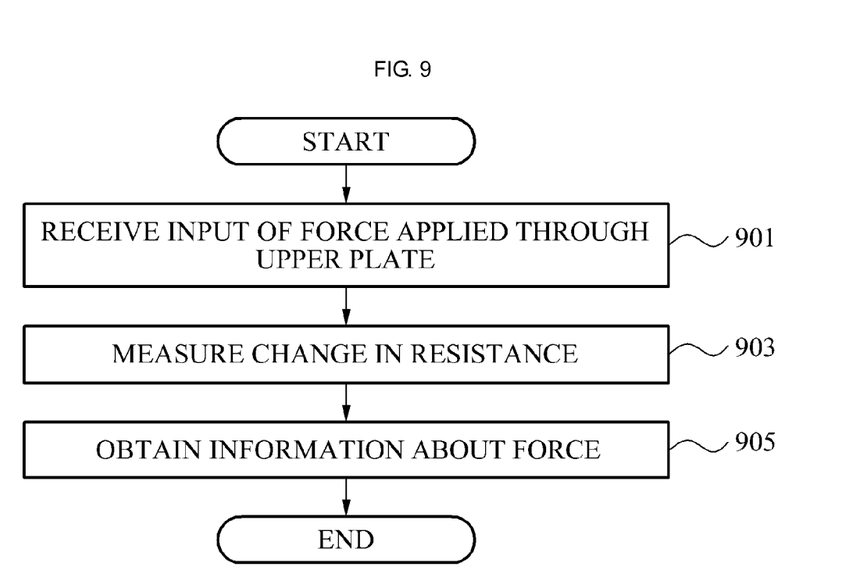
FIG. 9 illustrates an operational method of a flexible tactile sensor apparatus according to embodiments.

FIG. 9 illustrates an operational method of a flexible tactile sensor apparatus according to embodiments.

Referring to FIG. 9, the flexible tactile sensor apparatus may receive an input of a force applied through an upper plate, in operation 901. The flexible tactile sensor apparatus may receive the force through a bump that is formed on an upper portion of the upper plate to concentrate the applied force.

In this instance, when a distance between an upper nano wire array and a lower nano wire array is adjusted in proportion to the force applied through the upper plate, the flexible tactile sensor apparatus may increase or decrease a number of wires connected between the upper nano wire array and the lower nano wire array based on a result of adjusting the distance, whereby a resistance between the upper nano wire array and the lower nano wire array may be changed.

In operation 903, the flexible tactile sensor apparatus may measure a resistance to be changed in proportion to the force applied through the upper plate when the distance between the upper nano wire array and the lower nano wire array is adjusted.

In operation 905, the flexible tactile sensor apparatus may obtain information about the force, for example, a magnitude of the force and a direction of the force, using the measured resistance.

In particular, when a force is not applied, the flexible tactile sensor apparatus may obtain the magnitude of the force, as the information about the force, using a change in resistance between a first resistance measured before the distance is adjusted, for example, a default resistance measured when a predetermined distance is maintained, and a second resistance measured after the distance is adjusted. For example, when the second resistance is greater than the first resistance, the flexible tactile sensor apparatus may obtain, for example, a magnitude of a tensile force proportional to an increased amount. When the second resistance is less than the first resistance, the flexible tactile sensor apparatus may obtain, for example, a magnitude of a compressive force proportional to a reduced amount.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A flexible tactile sensor apparatus, comprising:
   an upper plate comprising an upper nano wire array;
   a lower plate comprising a lower nano wire array; and
   a fastener to adjust a distance between the upper nano wire array and the lower nano wire array, in proportion to a force applied through the upper plate,
   wherein the upper plate further comprises a bump to be touched by a finger of a user applying the force.

2. The apparatus of claim 1, wherein the upper nano wire array and the lower nano wire array are collinearly aligned to face each other and to be proximate to or separate from each other, based on the adjusted distance.

3. The apparatus of claim 1, wherein the fastener increases or decreases a number of wires connected between the upper nano wire array and the lower nano wire array, based on a result of adjusting the distance between the upper nano wire array and the lower nano wire array.

4. The apparatus of claim 1, wherein
the upper nano wire array and the lower nano wire array are formed of a conductive material, and
the upper plate and the lower plate are formed of an insulating material.

5. The apparatus of claim 1, further comprising:
a controller to obtain magnitude and direction of the force applied through the upper plate, by measuring a resistance, between the upper nano wire array and the lower nano wire array, wherein at least one of the magnitude and direction are changed based on a result of adjusting the distance between the upper nano wire array and the lower nano wire array.

6. The apparatus of claim 5, wherein the controller obtains the magnitude of the force, using a change in resistance between a first resistance measured before the distance is adjusted and a second resistance measured after the distance is adjusted.

7. The apparatus of claim 5, wherein the controller measures a plurality of resistances associated with a single force applied through the upper plate, and obtains a direction of the force based on differences among the plurality of resistances.

8. The apparatus of claim 5, wherein:
the controller obtains the magnitude of the force, using a change in resistance between a first resistance measured before the distance is adjusted and a second resistance measured after the distance is adjusted;
when the second resistance is greater than the first resistance, the controller obtains a magnitude of the tension force, which is proportional to a difference value between the first resistance and the second resistance; and
when the second resistance is less than the first resistance, the controller obtains a magnitude of the compression force, which is proportional to a difference between the first resistance and the second resistance.

9. The apparatus of claim 5, wherein:
the controller measures a plurality of resistances associated with a single force applied through the upper plate, and obtains a direction of the force based on differences among the plurality of resistances; and
when a left resistance between the upper nano wire array and the lower nano wire array that are disposed on a left side of the upper and lower nano wire arrays and a right resistance between the upper nano wire array and the lower nano wire array that are disposed on the right side of the upper and lower nano wire arrays are measured through the single force applied through the upper plate, and when the left resistance is greater than the right resistance, the controller obtains a shear force in a right direction, which is proportional to a difference between the left resistance and the right resistance.

10. The apparatus of claim 5, wherein:
the controller measures a plurality of resistances associated with a single force applied through the upper plate, and obtains a direction of the force based on differences among the plurality of resistances; and
when a left resistance between the upper nano wire array and the lower nano wire array that are disposed on a left side of the upper and lower nano wire arrays and a right resistance between the upper nano wire array and the lower nano wire array that are disposed on the right side of the upper and lower nano wire arrays are measured through the single force applied through the upper plate, and when the right resistance is greater than the left resistance, the controller obtains a shear force in a left direction, which is proportional to a difference between the left resistance and the right resistance.

11. The apparatus of claim 5, wherein:
wherein the controller measures a plurality of resistances associated with a single force applied through the upper plate, and obtains a direction of the force based on differences among the plurality of resistances; and
when the plurality of resistances measured in association with the single force applied through the upper plate is identical or differences among the plurality of resistances satisfy a predetermined range, the controller obtains a normal force magnitude corresponding to the changed resistances.

12. The apparatus of claim 1, wherein the bump is a plate.

13. The apparatus of claim 1, wherein the bump is smaller than a size of a lower
portion of the upper plate and concentrates the applied force to restrict dispersion of the applied force.

14. The apparatus of claim 1, wherein the upper plate and the lower plate are formed of an elastic and insulating material.

15. The apparatus of claim 1, wherein the fastener adjusts the distance between the upper nano wire array and the lower nano wire array, in proportion to the force applied through the upper plate or maintains the distance between the upper nano wire array and the lower nano wire array.

16. The apparatus of claim 15, wherein:
the applied force is a compression force;
when the distance between the upper nano wire array and the lower nano wire array decreases in proportion to the compression force, the fastener increases the number of wires connected between the upper nano wire array and the lower nano wire array to a number greater than a predetermined number of wires; and
when no force is applied through the upper plate, a resistance between the upper nano wire array and the lower nano wire array is less than a default resistance measured when a predetermined distance is maintained or is less than a resistance measured immediately before the compression force is applied.

17. The apparatus of claim 15, wherein:
the applied force is a tension force;
when the distance between the upper nano wire array and the lower nano wire array increases in proportion to the tension force, the fastener decrease the number of wires connected between the upper nano wire array and the lower nano wire array to a number less than a predetermined number of wires; and
when no force is applied, a resistance between the upper nano wire array and the lower nano wire array is greater than a default resistance measured when the predetermined distance is maintained or is greater than a resistance measured immediately before the tension force is applied.

18. A method for measuring force with a flexible tactile sensor having an upper plate including an upper nano wire, a lower plate including a lower nano wire, and a fastener, the method comprising:
applying a force through the upper plate of the flexible tactile sensor;

measuring a resistance to be changed in proportion to the force applied through the upper plate when the distance between an upper nano wire and a lower nano wire is adjusted; and obtaining a magnitude of the force and a direction of the force using the measured resistance, wherein the upper plate further comprises a bump to be touched by a finger of a user applying the force.

19. At least one computer readable medium storing computer readable instructions to control at least one processor to implement the method of claim 18.

\* \* \* \* \*

UNITED STATES PATENT AND TRADEMARK OFFICE
CERTIFICATE OF CORRECTION

PATENT NO. : 8,826,747 B2  
APPLICATION NO. : 13/709779  
DATED : September 9, 2014  
INVENTOR(S) : Hyung Kew Lee et al.

Page 1 of 1

It is certified that error appears in the above-identified patent and that said Letters Patent is hereby corrected as shown below:

On the Title Page

Column 1, Item [71] (Applicant), Line 2, Insert -- Industry-Academic Cooperation Foundation, Yonsei University, Seoul (KR) --, therefor.

Signed and Sealed this
Eighteenth Day of August, 2015

Michelle K. Lee
*Director of the United States Patent and Trademark Office*